United States Patent
Murtazin et al.

(10) Patent No.: US 12,292,331 B2
(45) Date of Patent: May 6, 2025

(54) DIAGNOSTIC TESTING METHOD FOR A SPECTROMETER

(71) Applicant: Thermo Fisher Scientific (Bremen) GmbH, Bremen (DE)

(72) Inventors: Ayrat Murtazin, Bremen (DE); Sebastian Geisler, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 519 days.

(21) Appl. No.: 17/532,127

(22) Filed: Nov. 22, 2021

(65) Prior Publication Data

US 2022/0163391 A1    May 26, 2022

(30) Foreign Application Priority Data

Nov. 23, 2020 (GB) .................................. 2018380

(51) Int. Cl.
*G01J 3/443* (2006.01)
*G01J 3/02* (2006.01)

(52) U.S. Cl.
CPC ............. *G01J 3/443* (2013.01); *G01J 3/0297* (2013.01)

(58) Field of Classification Search
CPC .......... G01J 3/443; G01J 3/0297; G01J 3/027; G01J 3/10; G01J 3/28; G01N 21/73; G01N 21/714

See application file for complete search history.

(56) References Cited

U.S. PATENT DOCUMENTS 6,029,115 A    2/2000 Tracy et al.
7,319,519 B2   1/2008 Florek et al.

(Continued)

FOREIGN PATENT DOCUMENTS

JP    H06-109639 A    4/1994
JP    H10-332485 A    12/1998

(Continued)

OTHER PUBLICATIONS

Li, Xiaohui, Benjamin W. Smith, and Nicolo Omenetto. "Relative spectral response calibration of a spectrometer system for laser induced breakdown spectroscopy using the argon branching ratio method." Journal of Analytical Atomic Spectrometry 29.4 (2014): 657-664 (Year: 2014).*

(Continued)

*Primary Examiner* — Tarifur R Chowdhury
*Assistant Examiner* — Roberto Fabian, Jr.
(74) *Attorney, Agent, or Firm* — Thomas F. Cooney

(57) ABSTRACT

A diagnostic testing method for a detector of a spectrometer. The spectrometer comprises a source of line spectra configured to emit at least one branched pair of spectral lines from an excited species. The method comprises performing a plurality of detector diagnostic measurements and diagnosing a detector operating condition. Each detector diagnostic measurement comprises measuring an intensity of a first spectral line emitted by an excited species of the source of line spectra using the detector, and measuring an intensity of a second spectral line emitted by the excited species of the source of line spectra using the detector. The first and second spectral lines emitted by the excited species of the source of line spectra form a branched pair of spectral lines, and the spectrometer is controlled to vary the intensity of the first and second spectral lines incident on the detector for the plurality of detector diagnostic measurements.

20 Claims, 9 Drawing Sheets

(56) References Cited

U.S. PATENT DOCUMENTS

| | | | |
|---|---|---|---|
| 7,768,639 | B1 | 8/2010 | Florek et al. |
| 8,822,948 | B1 | 9/2014 | Chan et al. |
| 10,012,537 | B2 * | 7/2018 | Garsha ..................... G01J 3/28 |
| 2009/0030632 | A1 * | 1/2009 | Tallavarjula ......... G01N 21/274 702/85 |
| 2011/0226744 | A1 | 9/2011 | Heinz et al. |

FOREIGN PATENT DOCUMENTS

| | | |
|---|---|---|
| JP | 2006-064449 A | 3/2006 |
| JP | 2007-078640 A | 3/2007 |
| JP | 2014-215055 A | 11/2014 |
| WO | 2014118326 A2 | 8/2014 |
| WO | 2018085841 A1 | 5/2018 |

OTHER PUBLICATIONS

Irons, F. E., and N. J. Peacock. "Spectrograph calibration at soft X-ray wavelengths. II. From branching ratios to the visible and near UV." Journal of Physics E: Scientific Instruments 6.9 (1973): 857 (Year: 1973).*

Veis, Pavel, Alicia Marín-Roldán, and Jaroslav Kristof. "Simultaneous vacuum UV and broadband UV-NIR plasma spectroscopy to improve the LIBS analysis of light elements." Plasma Sources Science and Technology 27.9 (2018): 095001 (Year: 2018).*

Bablok et al. "Application of statistical procedures in analytical instrument testing" Journal of Automatic Chemistry, Apr.-Jun. 1985, vol. 7, No. 2, pp. 74-79.

Danzer et al. "Guidelines for calibration in analytical chemistry. Part 2: Multicomponent calibration (IUPAC Technical Report)" Pure and Applied Chemistry, 2004, vol. 76, No. 6, pp. 1215-1225.

Danzer et al. "Calibration by orthogonal and common least squares? Theoretical and practical aspects" Journal of Analytical Chemistry, 1995, vol. 352, No. 5, pp. 407-412.

Doidge et al., "ICP emission spectrometer relative response by the branching-ratio method: branching ratios for Fe, Se, Te, Ge and Pd" Spectrochimica Acta Part B: Atomic Spectroscopy, U.S. Appl. No. 12/311,999, vol. 54, No. 14, pp. 2167-2182.

"EMVA Standard 1288 Standard for Characterization of Image Sensors and Cameras", European Machine Vison Association, Nov. 29, 2010, Release 3.0, 36 pages.

"Is My Calibration Linear?", Analyst, Nov. 1994, vol. 119, No. 11, pp. 2363-2366.

Li et al. "Relative spectral response calibration of a spectrometer system for laser induced breakdown spectroscopy using the argon branching ratio method" Journal of Analytical Atomic Spectrometry, Mar. 12, 2014, vol. 29, No. 4, pp. 657-664.

Passing et al. "A new biometrical procedure for testing the equality of measurements from two different analytical methods. Application of linear regression procedures for method comparison studies in clinical chemistry, Part I" Journal of Clinical Chemistry and Clinical Biochemistry, 1983, vol. 21, No. 11, pp. 709-720.

Togoni et al. "Combination of the ionic-to-atomic line intensity ratios from two test elements for the diagnostic of plasma temperature and electron number density in Inductively Coupled Plasma Atomic Emission Spectroscopy," Spectrochimica Acta Part B: Atomic Spectroscopy, May 2007, vol. 2, No. 5, pp. 435-443.

EP Extended Search Report dated Apr. 26, 2022, to EP Patent Application No. 21209851.1.

* cited by examiner

DIAGNOSTIC TESTING METHOD FOR A SPECTROMETER

CROSS REFERENCE TO RELATED APPLICATION

This application claims, under 35 U.S.C. 119(a), the right of priority to United Kingdom patent application No. GB2018380.2, which was filed on Nov. 23, 2020, the disclosure of which is incorporated herein by reference in its entirety.

FIELD OF THE DISCLOSURE

The present disclosure relates to a spectrometer. In particular, the present disclosure relates to spectrometers comprising a plasma light source.

BACKGROUND

The operation of analytical instruments, such as spectrometers, involve interactions between a number of high-level assembly (HLA) parts. In order to ensure smooth operation of the analytical instrument, it is beneficial to be able to identify when the operation of an HLA part deviates from its expected behaviour. It may also be beneficial to be able to identify if a specific HLA part is operating as expected in order to exclude this part from further fault-finding steps. Moreover, early detection of an HLA part with deviating behaviour may allow for predictive maintenance to be carried out.

In sequential analytical plasma spectrometers one such HLA part is a single channel detector, such as a photomultiplier tube (PMT) and in simultaneous analytical plasma spectrometers, one such HLA part is a multichannel detector, such as a charge coupled detector (CCD), a complementary metal oxide semiconductor (CMOS) detector, or a charge injection device (CID) detector camera. To check the behaviour of a single channel or multichannel detector, a separate light source with a known broad wavelength spectrum and adjustable radiation flux may be used. Mercury pen lamps, deuterium lamps or tungsten lamps are often used for this purpose.

To check the behaviour of the detector, the separate light source can be mounted to the spectrometer and adjusted. Alternatively, the detector can be disassembled from the spectrometer, and tested on a test rig equipped with the stable light source. As such, testing the detector with the light source involves some degree of manual assembly/disassembly of the spectrometer.

Furthermore, the light sources used for testing are known to degrade with time. Thus, the light source must also be recalibrated on a regular basis in order to maintain the known broad wavelength spectrum.

Another known method for checking the behaviour of a detector of an analytical plasma spectrometer is to nebulise a series of standard solutions of known concentration into a plasma and to measure the analytical signals generated by standard species. The standard solutions with different concentrations can be prepared and nebulized into the plasma to create different concentrations of analyte atoms inside the plasma observation zone and produce therefore different light intensities at the detector. Preparation and maintenance of the standard solutions is time consuming, as the solutions may vary in concentrations over time as the solutions age. Changing the solutions with different concentration levels requires user intervention or use of an autosampler. Standard solution-based methods are known to be prone to dilution errors. Moreover, variations of the solution flow rate, atomization efficiency and temperature inside the source when standard solution concentrations change would result in non-linearity of the dependency of measured signal on concentration. Such source originated non-linearity may lead to an incorrect conclusion that the response of the detector that is non-linear.

In addition to the sources of non-linearity above, another source of non-linearity is a self-absorption phenomenon that manifests itself when species in the steady state (i.e., non-excited) absorb part of the light emitted by the same species in an excited state.

The precision of both standard solution-based methods and external light source methods are limited, even in the case of a perfectly operated detector, by random noise generated by the light source. This random noise is present in each measurement performed by the detector and is typically up to a few percent of the signal. The main components of the source noise are shot noise and flicker noise.

One known type of spectrometer is an analytical plasma spectrometer. Such spectrometers may use an inductively coupled plasma (ICP), laser-induced plasma (LIP), microwave-induced plasma (MIP), electrical arc or spark discharges as a source of optical radiation. The optical radiation from an ICP and LIP source was used to determine the spectral response of a spectrometer in P. S. Doidge et al., Spectrochim. Acta, 1999, B54, 2167-2182 and X. Li, B. W. Smith, N. Omenetto J. Anal. At. Spectrom., 2014, 29, 657-664, respectively. In these papers, the intensity of pairs of spectral lines originating from the same upper energy level of the same plasma gas or analyte element were measured. The relative intensities of these pairs of spectral lines were taken together with the known branching ratio of the pairs of spectral lines in order to calculate the spectral response curve of the spectrometer. Pairs of spectral lines which overlap in wavelength across a broad wavelength range are measured in order to construct the spectral response curve of the system across a broad wavelength range.

It is an object of this disclosure to provide an improved diagnostic testing method for a detector of a spectrometer source which tackles at least one or the problems associated with prior art methods, or at least, provides a commercially useful alternative thereto.

SUMMARY

As explained in this disclosure, it is possible to use the intensity relationship between pairs of branched spectral lines emitted by species of a suitable source of line spectra in order to perform a diagnostic test for a detector of a spectrometer comprising said source of line spectra.

According to a first aspect of the disclosure, a diagnostic testing method for a detector of a spectrometer comprising a source of line spectra is provided. The source of line spectra is configurable to emit at least one branched pair of spectral lines from an excited species. The diagnostic testing method comprises:

performing a plurality of detector diagnostic measurements; each detector diagnostic measurement comprising:

measuring an intensity of a first spectral line emitted by an excited species of the source of line spectra using the detector; and measuring an intensity of a second spectral line emitted by the excited species of the source of line spectra using the detector;

wherein the first and second spectral lines emitted by the excited species of the source of line spectra form a branched pair of spectral lines;

wherein the spectrometer is controlled in order to vary the intensity of the first and second spectral lines incident on the detector for the plurality of detector diagnostic measurements; and diagnosing an operating condition of the detector based on a ratio of the intensity of the first spectral line to the intensity of the second spectral line for each of the plurality of detector diagnostic measurements.

Advantageously, the method according to the first aspect utilises the source of line spectra of the spectrometer as part of the diagnostic testing method for the detector of the spectrometer. The method according to the first aspect does not require an external light source and does not require the source of line spectra or the detector to be removed from the spectrometer in order to perform the diagnostic testing method. Rather, the operating condition of the detector of the spectrometer can be diagnosed in situ by using the source of line spectra of the spectrometer. By diagnosing an operating condition of the detector in situ, the diagnostic testing method can quickly and efficiently identify whether the behaviour of the detector (an HLA part) is performing as expected or whether further investigation of the detector is required. As such, the diagnostic testing method may improve a fault diagnosis process or a maintenance process for a spectrometer.

The diagnostic method of the first aspect of the invention utilises spectral lines emitted by excited species of the source of line spectra (e.g., argon in ICP source). As such, the diagnostic testing method according to the first aspect may be performed also without the use of standard solutions to provide the excited species. Using the spectral emissions from the source of line spectra avoids any measurement uncertainty that may be associated with dilution or ageing variance of standard solutions. Accordingly, the method of the first aspect provides a diagnostic testing method with improved efficiency and precision.

The diagnostic testing method of the first aspect utilises the intensity relationship between pairs of branched spectral lines. This relationship is independent of the conditions inside the source of line spectra and the concentration of the associated species in the source of line spectra. Thus, the diagnostic testing method according to the first aspect may be performed with improved accuracy. Furthermore, as the diagnostic testing method may not require any further adjustment of the spectrometer, the diagnostic testing method may be easily incorporated into a wholly, or partly, automated spectrometer diagnostic workflow.

In some embodiments, the excited species are provided by one or more of a standard solution having a known concentration nebulised into the plasma, or a plasma gas species. In some embodiments where excited species are provided by a standard solution, the diagnostic method may be performed a plurality of times, each time using a standard solution having a different known concentration. Accordingly, the diagnostic testing method may include the generation of a concentration curve in order to further improve the accuracy of the diagnostic testing method.

In some embodiments, at least one of: the source of line spectra, the detector, and one or more optical elements between the source of line spectra and the detector is controlled in order to vary the intensity of the first and second spectral lines incident on the detector for the plurality of detector diagnostic measurements. By varying the intensity of the spectral lines through control of the spectrometer, the diagnostic testing method may be easily implemented as an automated testing process.

By source of line spectra, it is understood that a source of electro-magnetic radiation is provided. The electro-magnetic radiation (e.g., light) is emitted by the excited species of the source of line spectra. The source of line spectra may comprise one or more excited species. It is understood that excited species are those which are excited to a higher level energy state. Electromagnetic radiation is emitted as a spectral line when the species transitions from a higher-level energy state to a lower level. A branched pair of spectral lines are formed when species transition from the same higher level energy state to different lower level energy states. As such, it is understood that a source of line spectra emits light having at least one pair of spectral lines (first and second spectral lines) which have been generated by radiative transitions from the same higher-level energy state to different lower energy levels.

In some embodiments, the source of line spectra is a plasma source. For example, the plasma source may be an inductively coupled plasma source (ICP), laser-induced plasma (LIP), microwave-induced plasma (MIP), electrical arc or spark discharges, or any other plasma source. In some embodiments, the source of line spectra may be a flame or a furnace. In some embodiments, the excited species are provided by a standard solution having a known concentration nebulised into the plasma source.

In some embodiments where the source of line spectra is a plasma source, controlling the plasma source in order to vary the intensity of the first and second spectral lines comprises controlling one or more of: an auxiliary gas flow rate, a nebulizer gas flow rate, and a cooling gas flow rate. A spectrometer may comprise one or more mass flow controllers for controlling the auxiliary gas flow rate, the nebulizer gas flow rate, and/or the cooling gas flow rate. Thus, the diagnostic testing method may be economically implemented on spectrometers without additional control components.

In some embodiments, if a simultaneous spectrometer is used, the measurement of the intensity of the first spectral line is performed at the same time as the measurement of the intensity of the second spectral line. By measuring the first and second spectral lines at the same time, flicker noise which is present in the measurement of the first spectral lines will be correlated with flicker noise which is present in the measurement of the second spectral lines. This flicker noise may be reduced or eliminated from the subsequent determination of the operating condition of the detector, as the determination is based on the ratio of the two measurements. By eliminating the flicker noise, the operating condition of the detector may be diagnosed to a very high degree of precision.

In some embodiments, the diagnostic testing method further comprises performing a further plurality of detector diagnostic measurements using a different branched pair of spectral lines emitted by an excited species of the source of line spectra. The different branched pair of spectral lines may be emitted by the same excited species of the source of line spectra, or a different excited species of the source of line spectra. The determination of the operating condition of the detector may then take into account the ratio of the intensity of the different branched pair of spectra lines for each of the further plurality of detector diagnostic measurements. As such, the diagnostic testing method may be repeated using multiple pairs of branched spectral lines emitted by the source of line spectra. By using multiple pairs of branched spectral lines, the working range and accuracy of the diagnostic testing method may be further improved.

In some embodiments, the diagnostic testing method may be used to diagnose different regions of a detector. As such, the diagnostic testing method of the first aspect may be repeated, wherein different regions of the detector are illuminated by the source of line spectra. In some embodiments where a plurality of branched pairs of spectral lines are measured, the different branched pairs of spectral lines may be used to test different areas of a detector. In some embodiments, one or more optical elements between the detector and the source of line spectra may be used to direct the spectral lines to different regions of the detector. In some embodiments, at least one of the optical elements may be a dispersive optical element. Accordingly, the diagnostic testing method may be used to determine an operating condition of specific regions of a detector. As such, the diagnostic testing method may be used to determine whether there are any variations in the operating condition of a detector across a detector area.

In some embodiments, the operation condition of the detector diagnosed comprises a normal operating condition, or an irregular operating condition. By normal operating condition, it is understood that the response of the detector to the spectral lines of varying intensity is a sufficiently linear response for the purpose of the experiments to be performed on the spectrometer. The skilled person appreciates that due to expected experimental noise, the response of the detector operating under a normal operating condition may not be exactly linear. As such, a normal operating condition of the detector may have a response that is substantially linear (i.e. within a narrow range of being considered linear). In some embodiments, the range of what is considered linear (i.e. the range of normal operation) may be specified by as a user as an input parameter for the diagnostic testing method.

By irregular operating condition, it is understood that the response of the detector is not behaving as expected. In some embodiments, the irregular operating condition may comprise a non-linear operating condition and an excessive noise operating condition. As such, the diagnostic testing method may categorise the irregular operating condition as being a result of a non-linear operating condition or an excessive noise operating condition (or any other operating condition). As such, where the irregular operating condition is diagnosed, the method may further comprise diagnosing a non-linear operating condition or an excessive noise operating condition based on a ratio of the intensity of the first spectral line to the intensity of the second spectral line for each of the plurality of detector diagnostic measurements.

In the non-linear operating condition, the diagnostic method diagnoses that the ratios deviate from the expected linear behaviour in a systematic manner. It is understood that the response of the detector to the spectral lines of varying intensity is non-linear to the extent that it is detrimental to the accuracy of the experiments to be performed on the spectrometer. As such, a determination of a non-linear operating condition may be an indication that there is a fault with the detector which may require further investigation.

In the excessive noise operating condition, the ratios for each diagnostic measurement fluctuate excessively around the expected linear relationship.

In some embodiments, diagnosing the normal operating condition of the detector comprises determining that the ratio of the intensity of the first spectral line to the intensity of the second spectral line for each of the plurality of detector diagnostic measurements forms a linear relationship. For example, a linear relationship may be determined when each of the ratios determined for the plurality of detector diagnostic measurements falls within a predetermined range. In some embodiments, a normal operating condition may be determined where the ratio of the intensity of the first spectral line to the second spectral line is substantially constant for the plurality of detector diagnostic measurements. By substantially constant, the method may diagnose the normal operating condition based on the residual standard deviations of the intensity ratios for the plurality of detector diagnostic measurements.

In some embodiments, if the irregular (or non-linear) operating condition is diagnosed, the diagnostic testing method further comprises determining whether the first spectral line and/or the second spectral line forming a branched pair of spectral lines are subject to a self-absorption phenomenon. Self-absorption phenomenon occur when light of the first and/or second spectral lines interacts with the species of the source of line spectra, thereby reducing the intensity of the respective spectral line relative to the expected value (based on the transition probability). The diagnostic testing method may also perform a check to see if a determined irregular (or non-linear) operating condition may be explained by a self-absorption phenomenon, rather than an operating condition of the detector.

In some embodiments, if self-absorption of the first and/or second spectral line is determined, the diagnostic method may be performed again using an additional pair of branched spectral lines having different wavelengths. Thus, the diagnostic testing method may detect and self-correct for any self-absorption that may be present in the source of line spectra.

In some embodiments, if the irregular operating condition is diagnosed, the diagnostic testing method further comprises determining whether the measurements of the first spectral lines and/or the measurements of the second spectral lines are subject to line positioning error. Line positioning error occurs when the location of the first and/or second spectral lines incident on the detector are shifted relative to their expected positions. Line positioning error may be caused by temperature variations in the one or more optical elements and the like. By checking to see if line positioning error has occurred, the diagnostic testing method may have improved reliability.

In some embodiments, if line positioning error is determined to have occurred, the spectrometer is adjusted to reduce the line positioning error. Following adjustment, the plurality of detector diagnostic measurements may be repeated. By repeating the measurement following adjustment, the accuracy of the detector diagnostic measurements may be improved. In some embodiments, the measurements of the first and second spectral lines may be recalibrated to account for the line positioning error, wherein the operating condition of the detector is determined based on a ratio of a recalibrated intensity of the first spectral line to a recalibrated intensity of the second spectral line for each of the plurality of detector diagnostic measurements. As such, in some embodiments, the spectrometer may account for line positioning error without repeating measurements. Such features may allow for a diagnostic testing method which is performed relatively quickly.

In some embodiments, the diagnostic testing method is performed on one or more of: a photomultiplier tube detector, a charge coupled detector (CCD), a complementary metal oxide semiconductor (CMOS) detector, a charge injection device (CID) detector. As such, the diagnostic testing method may be performed on a wide range of spectrometers incorporating a wide range of detectors.

According to a second aspect of the disclosure, a method of optical emission spectrometry for a spectrometer is provided. The spectrometer comprises a plasma source and a detector. The method of the second aspect comprises performing the diagnostic testing method of the first aspect of the disclosure. For example, according to the second aspect the diagnostic testing method may be performed as part of an optical emission spectrometry analysis workflow. Alternatively, the diagnostic testing method may be performed as part of a maintenance workflow for an optical emission spectrometer.

The method of the second aspect of the disclosure may incorporate any of the optional features discussed above in relation to the first aspect of the disclosure and any associated advantages.

According to a third aspect of the disclosure, a spectrometer is provided. The spectrometer comprises a plasma source, a detector, and a controller. The spectrometer is configured to perform a diagnostic test of the detector. The controller is configured to perform a plurality of detector diagnostic measurements, wherein for each diagnostic detector measurement:

the detector is configured to measure an intensity of a first spectral line emitted by an element of the plasma source;

the detector is configured to measure an intensity of a second spectral line emitted by the element of the plasma source;

wherein the first and second spectral lines emitted by the element of the plasma source form a branched pair of spectral lines.

The controller is configured to control the spectrometer in order to vary the intensity of the first and second spectral lines incident on the detector for the plurality of detector diagnostic measurements. The controller is configured to diagnose an operating condition of the detector based on a ratio of the intensity of the first spectral line to the intensity of the second spectral line for each of the plurality of detector diagnostic measurements.

Thus, according to a third aspect of the disclosure, a spectrometer may be provided which is configured to perform the diagnostic testing method of the first aspect of the disclosure. The spectrometer may also be configured to perform the method of optical emission spectrometry according to the second aspect of the disclosure.

The spectrometer of the third aspect of the disclosure may incorporate any of the optional features discussed above in relation to the first or second aspects of the disclosure and any associated advantages.

According to a fourth aspect of the disclosure, a computer program is provided. The computer program comprises instructions which, when executed causes the spectrometer of the third aspect of the disclosure to carry out a diagnostic testing method in accordance with the first aspect of the disclosure or a method of optical emission spectrometry in accordance with the second aspect of the disclosure.

According to a fifth aspect of the disclosure, a computer-readable medium having stored thereon the computer program of the fourth aspect is provided.

BRIEF DESCRIPTION OF THE FIGURES

Embodiments of the disclosure will now be described, by way of example only, with reference to the accompanying drawings in which.

DETAILED DESCRIPTION

Figure 1:
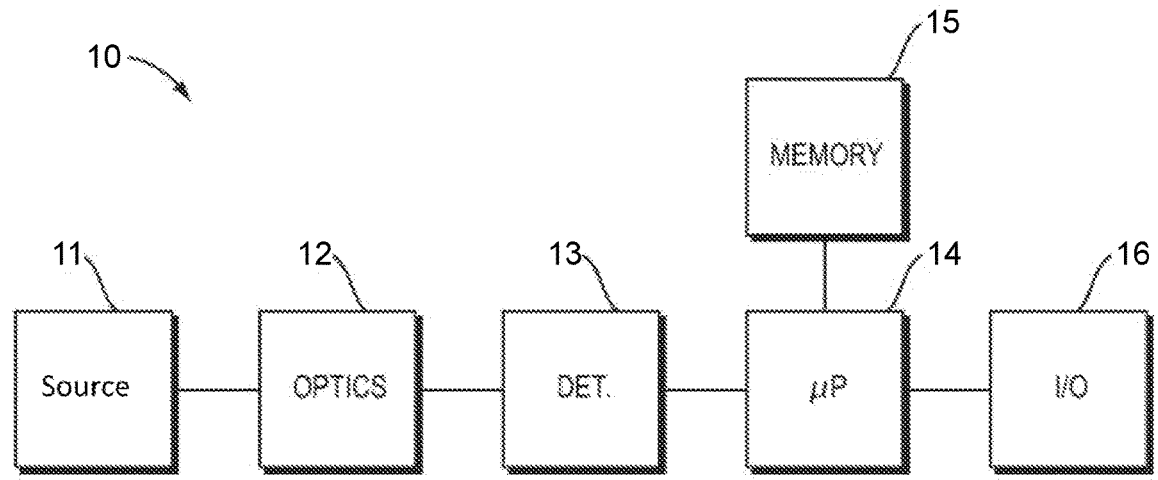
FIG. 1 shows a schematic diagram of a spectrometer according to an embodiment of the disclosure.

According to an embodiment of the disclosure, a spectrometer 10 is provided. The spectrometer 10 is configured to perform a diagnostic testing method according to embodiments of the disclosure. A schematic diagram of the spectrometer 10 is shown in FIG. 1. As shown in FIG. 1, the spectrometer 10 comprises a source of line spectra 11, an optical arrangement 12, a detector 13, a processor (µP) 14, a memory 15, and an input/output (I/O) unit 16.

Figure 2:
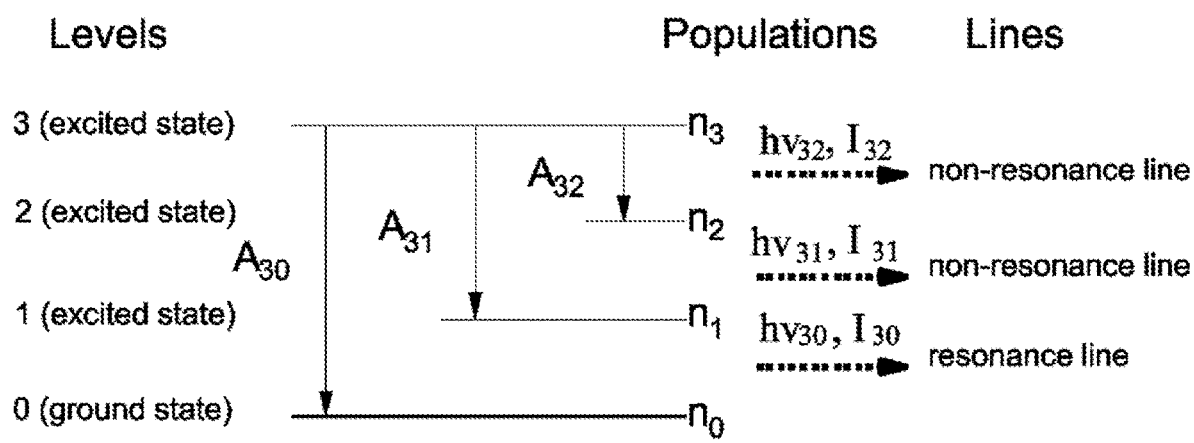
FIG. 2 shows an explanatory diagram of excited species generating a branched pair of spectral lines.

In the embodiment of FIG. 1, the source of line spectra 11 is a plasma source, such as an inductively coupled plasma (ICP) source. In other embodiments, the source of line spectra 11 may be a furnace or any other high temperature light source which generates excited species. FIG. 2 shows an explanatory diagram of possible excited states of a species within the source of line spectra 11. For example, in the ICP source of FIG. 1, the excited species may be an element of the plasma gas. As shown in FIG. 2, the excited species may have a plurality of different excited states (represented by indexes 1, 2, 3) with different populations $n_1$, $n_2$, $n_3$, and a ground state (represented by index 0) with population $n_0$. As shown in FIG. 2, the transition of an excited species between a higher level excited state (3) and a lower level energy state (2, 1, 0) results in the emission of a photon having an energy corresponding to the change in energy level ($h\nu_{32}$, $h\nu_{31}$, $h\nu_{30}$). The relative intensity of each spectral line ($l_{32}$, $l_{31}$, $l_{30}$) emitted is proportional to the transition probability ($A_{32}$, $A_{31}$, $A_{30}$) for the respective transition. It will be appreciated that an excited species in a relatively high-level excited state (e.g. 3) may transition to more than two different energy levels (e.g. 2, 1, or 0). Accordingly, an excited state energy level may give rise to more than one branched pair of spectral lines. For example, as is shown in FIG. 2 the transitions between excited state energy level three gives rise to a first branched pair of spectral lines $l_{32}$, and $l_{31}$, and a second branched pair of spectral lines $l_{32}$, and $l_{30}$. In some embodiments, it may be preferable to select branched pairs of spectral lines for analysis where none of the spectral lines are a resonance line. For example, in the example of FIG. 2, the second branched pair includes a spectral line $l_{30}$ which is a resonance line and therefore may be prone to self-absorption effects.

In the embodiment of FIG. 1, the optical arrangement 12 may comprise an echelle grating and a prism (and/or a further grating) to produce an echelle spectrum of the light produced by the source of line spectra 11. An image of the two-dimensional echelle spectrum is formed on the detector 13. As such, the optical elements are configured to produce an echelle spectrum on the detector 13. It will be appreciated that the optical arrangement 12 is configured to direct radiation from the source of line spectra 11 to the detector such that the radiation is suitable for detection by the detector 13. As such, in other embodiments where an echelle spectrum is not detected by the detector, the optical arrangement 12 may be adapted to deliver the desired form of radiation to the detector 13.

In the embodiment of FIG. 1, the detector 13 may be a CCD (charged coupled device) array. A typical CCD array may have at least approximately 1024×1024 pixels (1 Megapixel). The CCD array may be arranged for producing spectrum intensity values corresponding with the measured amount of light of the echelle spectrum, and for transferring the spectrum values to the processor 14. As such, the detector 13 may be a multichannel detector that is configured to detect a plurality of different wavelengths. The detector 13 (such as in the embodiment of FIG. 1) may be configured to detect an echelle spectrum. In other embodiments, the detector 13 may be a CMOS or CID detector.

In some embodiments, the detector 13 may be single channel device, such as a photomultiplier tube (PMT). Wavelength selection and filtering may be performed using the optical arrangement 12. As such, the optical arrangement 12 in some embodiments may be used to select whether the first spectral line or the second spectral line is incident on the detector 13. The processor 14 may be configured to control the optical arrangement 12 in order to select the wavelength of light that may be incident on the detector 13.

The processor 14 (controller) may comprise a commercially available microprocessor and the like. The memory 15 can be a suitable semiconductor memory and may be used to store instructions allowing the processor 14 to carry out an embodiment of the method according to this disclosure. The processor 14 and memory 15 may be configured to control the spectrometer to perform a diagnostic testing method according to embodiments of this disclosure. As such, the memory 15 may comprise instructions which, when executed by the processor 14, cause the spectrometer to carry out a diagnostic testing method according to embodiments of this disclosure.

Next, a diagnostic testing method for the detector 13 will be described with reference to FIG. 3A. The diagnostic testing method may be performed by the spectrometer 10 shown in FIG. 1.

Initially, in step 101 the processor 14 selects a pair of branched spectral lines which are emitted by the source of line spectra 11 to be used in the diagnostic testing method. As such the processor 14 selects a first spectral line to be measured and a second spectral line to be measured. In the embodiment of FIG. 1, the branched pair of spectral lines selected may correspond to a pair of branched spectral lines emitted by an excited element of the plasma gas within the ICP plasma source. The wavelengths of pairs of branched spectral lines for plasma sources and other source of line spectra are well known to the skilled person. For example, a number of branched pair spectral lines are identified in P. S. DOIDGE et al., 1999 or can be easily found in spectral line databases such as NIST Atomic Spectra Database. The pair(s) of branched spectral lines to be measured according to the method may be selected by the processor 14 from a predetermined list of spectral line wavelengths stored in the memory 15. Alternatively, the pair of branched spectral lines to be measured in the diagnostic testing method may be selected by the user as an input to the processor 14 prior to the commencement of the diagnostic testing method.

Next, in step 102 a plurality of detector diagnostic measurements may be performed. Each detector diagnostic measurement comprises measuring an intensity of the first spectral line emitted by the source of line spectra 11 using the detector 13. The plurality of detector diagnostic measurements also comprise measuring an intensity of the second spectral line emitted by the source of line spectra 11 using the detector 13. As such, the detector 13 measures the two spectral lines associated with the branched pair of spectral lines selected by the processor 13 initially.

The measurement of the intensities of the first and second spectral lines is repeated by the detector 13 a plurality of times as the intensities of the first and second spectral lines are varied. The spectrometer 10 (e.g. processor 14) may vary the intensities of the first and second spectral lines, for example, by controlling the source of line spectra 11. In the embodiment of FIG. 1, the intensities of the branched pair of spectral lines may be varied by controlling the power supplied to the source of line spectra 11. In the case of an ICP spectral source, the power may be varied, for example between 800 W and 1600 W in regularly spaced intervals (e.g. 200 W intervals) wherein a measurement of the branched pair of spectral lines may be performed at each interval. In some embodiments, only a single measurement of each of the first and second spectral lines may be taken at each intensity level, whilst in other embodiments a plurality of measurements (i.e. repeat measurements) may be performed at each intensity level. Performing a plurality of measurements may allow the diagnostic testing method to minimize a shot noise component in the measurements and thus improve the precision of the test.

Figure 3A:
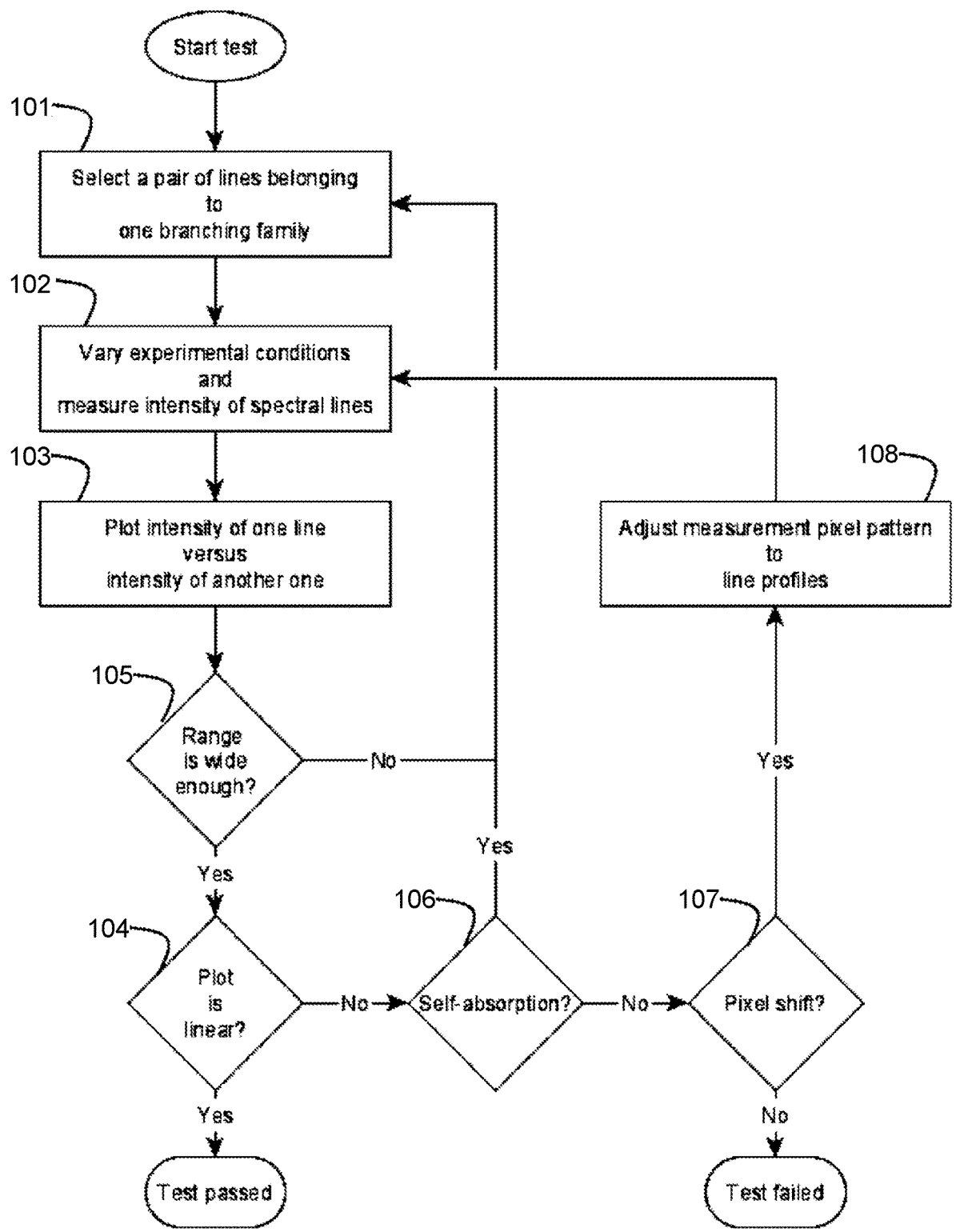
FIG. 3A shows an example flow chart of a diagnostic testing method according to an embodiment of the disclosure.

In the embodiment of FIG. 3A, measurement of the intensities of the first and second spectral lines is performed simultaneously. By performing the measurement of the first and second spectral lines simultaneously, the flicker noise present in the measurement of the first spectral line will be correlated with the noise present in the measurement of the second spectral line. The ratio of these two measurements will be free from the flicker noise component. Accordingly, performing a simultaneous measurement of the first and second spectral lines may allow for the linearity of the detector 13 to be determined with improved precision, relative to performing non-simultaneous measurements.

Of course, in other embodiments where the detector 13 (e.g. a detector comprising a photomultiplier tube) is not configured to perform simultaneous measurements of different wavelengths of light, the measurements of the first and second spectral lines may be performed at different times. In some embodiments where the first and second spectral lines of each branched pair of spectral lines are not measured simultaneously, the second spectral line may be measured directly after the first spectral line for each detector diagnostic measurement. By measuring the spectral lines in this manner, the flicker noise present in the first and second spectral lines may be more closely correlated, thereby improving the precision of the diagnostic testing method.

Figure 4:
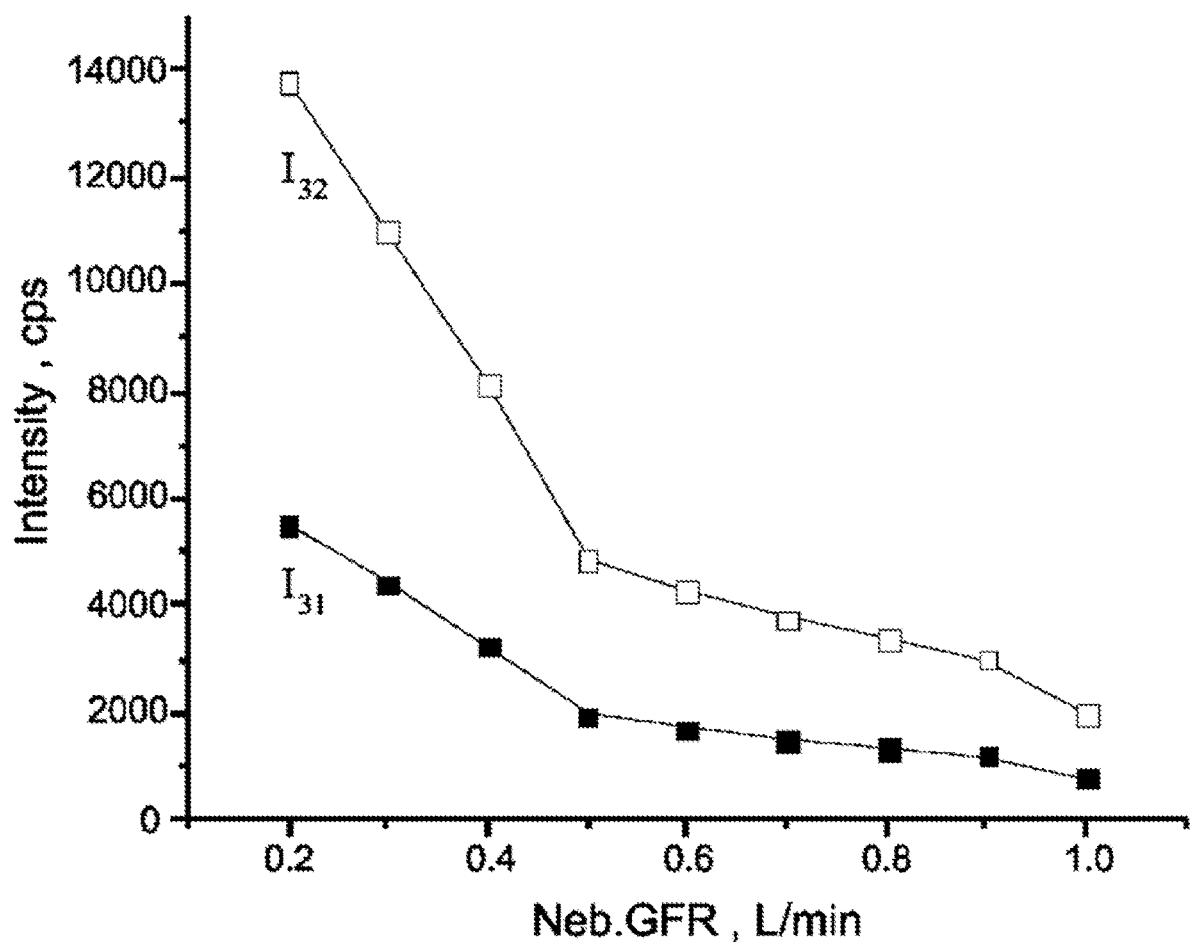
FIG. 4 shows a graph of branched pair spectral line intensity for different plasma source power levels.

A graph of the intensity of the first and second spectral lines is shown in FIG. 4. In some embodiments, nebulizer gas flow is varied in order to perform a plurality of diagnostic detector measurements at different spectral line intensities. As shown in FIG. 4, a single measurement of each spectral line is performed at each intensity. In other embodiments, a plurality of diagnostic detector measurements may be performed at each intensity setting if required. The data points shown in FIG. 4 are produced by a simulation of the spectral line intensities for different nebulizer gas flow rates as an example of the data generated by embodiments of the invention.

Figure 5:
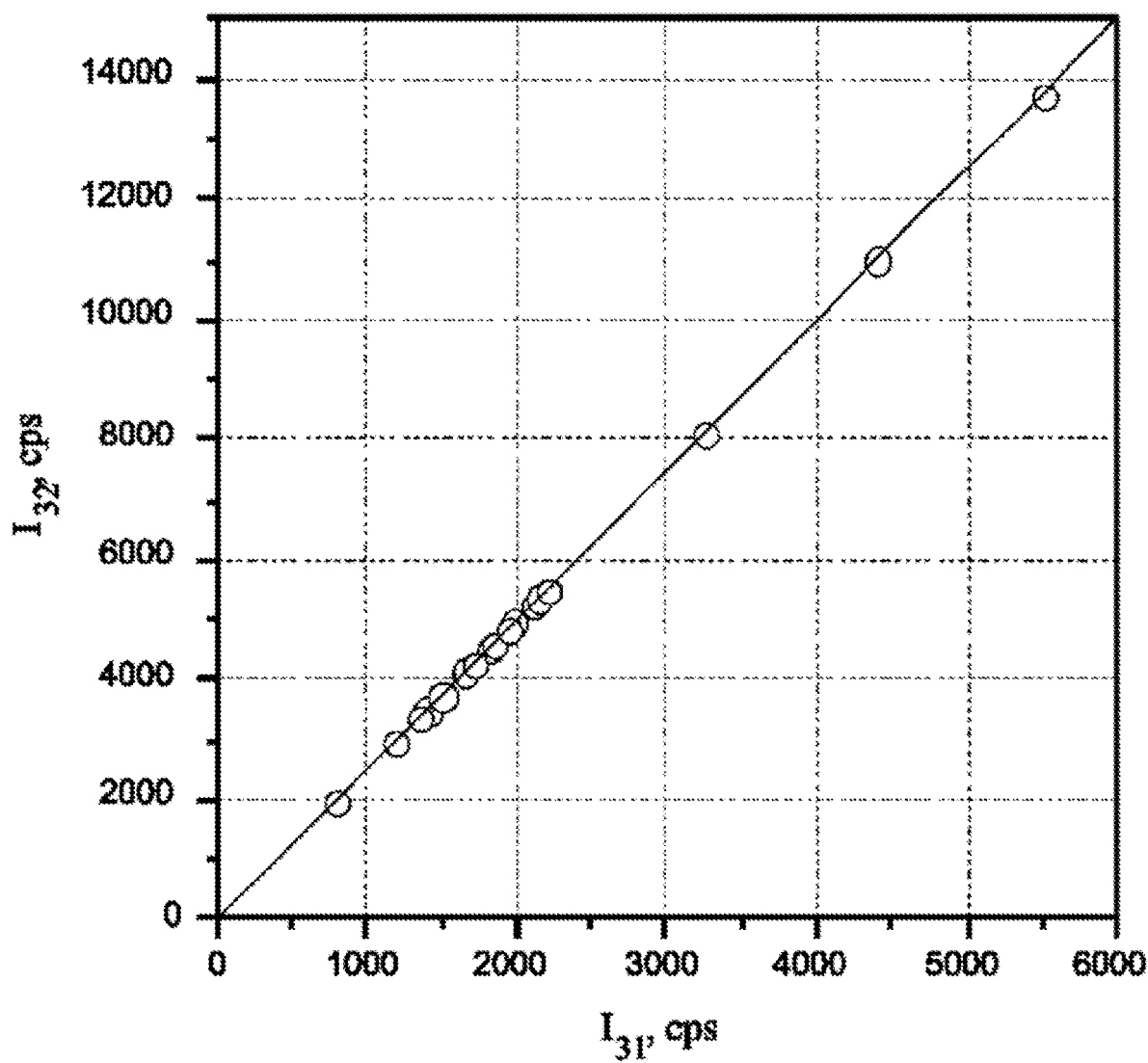
FIG. 5 shows a graph of the intensities of FIGS. 4 and 6 plotted against each other.

Following the performing of the plurality of detector diagnostic measurements, the processor 14 may diagnose an operating condition of the detector based on the plurality of detector diagnostic measurements. As indicated in step 103 of FIG. 3A, one method for diagnosing the operating condition of the detector is to plot each measured intensity of the second spectral line against the corresponding measured intensity of the first spectral line. An example of such a graph is shown in FIG. 5. FIG. 5 shows a plot of the data of FIG. 4 and FIG. 6. It will be appreciated by the skilled person that because the ratios of the transition probabilities and spectral responses for the two spectral lines are constant, the graph of the intensities of the spectral lines should form a linear relationship. Where the intensities of the spectral lines do not form a linear relationship or are scattered extensively, the processor 14 may diagnose that the detector is not performing in the expected manner (an irregular operating condition).

Accordingly, in step 104 the processor 14 diagnoses an operating condition of the detector 13 based on the constancy of a ratio of the intensity of the first spectral line to the intensity of the second spectral line (or, in other words, the closeness of measured intensity points to the straight line with the slope defined by the transition probabilities and spectral response values) for each of the plurality of detector diagnostic measurements.

For example, in some embodiments regression line parameters may be calculated by the processor 14 for the pairs of intensity measurements (e.g. $I_{32}/I_{31}$). These parameters can be calculated by ordinary least squares, or preferably by orthogonal least squares (see examples in K. Danzer et al. Fresenius J. Anal. Chem, 1995, 352, 407-412 and W. Bablok, H. Passing J. Automatic Chem., 1985, 7, 74-79) or non-parametric methods such as Passing-Bablok method (H. Passing, W. Bablok, J. Clin. Chem. Clin. Biochem., 1983, 21, 709-720). Then the residuals, namely the distances of the measured points to the regression line obtained in the previous step may be calculated by the processor 14. In the event that the detector is operating in a normal operating conditions, the calculated residuals would be expected to be randomly distributed very close to their mean value equal to 0. The processor may then compare each relative residual (i.e., the distance from the measured point to the regression line divided by the distance of the corresponding point of the regression line to the plot origin) to a given critical value, and where one or more of the calculated relative residuals exceed the critical value the processor 14 may determine that the operating condition of the detector is irregular. The predetermined critical value may be stored in the memory 15 or may be specified by the user using the processor 14, for example.

In some embodiments, a standard deviation of the residuals may be used to test detector operating conditions using F-test as described in e.g., "Is My Calibration Linear?", Analyst, November 1994, Vol. 119, pp. 2363-2366 and "Guidelines For Calibration in Analytical Chemistry" Pure & Appl. Chem., Vol. 70, No. 4, pp. 993-1014, 1998. Other methods of analysing the intensity ratios for each pair of intensity ratio may also be used. For example, other method for analysing the residuals from a regression line are described further in "EMVA Standard 1288 Standard for Characterization of Image Sensors and Cameras", Release 3.0, Nov. 29, 2010.

In some embodiments, where the irregular operating condition is detected the processor 14 may use further statistical tests to determine if the detector 13 is operating in an excessive noise irregular operating condition or non-linear irregular operating condition at step 104. That is to say, the detector may apply further statistical tests to try to characterise the irregular behaviour of the detector 13. As discussed above, the processor may be configured to generate a regression line and to calculate residuals for each pair of intensity measurement relative to the regression line. The determination of the non-linear operating condition and excessive noise operating condition may be based on analysis of the residuals of the intensity ratios. The non-linear operating condition may be determined to occur where the residuals show a systematic error in the residuals relative to the regression line. The excessive noise operating condition may be determined to occur where the residuals show a random but relatively broad distribution.

The difference between two cases can be easily found by visual inspection of the residuals plot but more objective and automated may also be performed by the processor. For example, in one embodiment the processor 14 may distinguish between these two cases by scoring the residuals with the values −1 and +1 and applying the run test to them. If there is a non-liner relationship between the intensity values, there may be a significant number of consecutive measurements either above or below the regression line. In another embodiment, the processor may distinguish between the non-linear operating condition and the excessive noise operating condition by calculation of the cusum statistic and applying Kolmogorov-Smirnov test to it, as described in H. Passing, W. Bablok, J. Clin. Chem. Clin. Biochem., 1983, 21, 709-720. For each test, a threshold value may be specified by the user, or stored in the memory. By comparing the results of the test to the respective threshold value, the processor 14 determines whether the detector 13 (which has been determined to be operating in an irregular operating condition) is operating in a non-linear operating condition or an irregular operating condition.

Figure 3B:
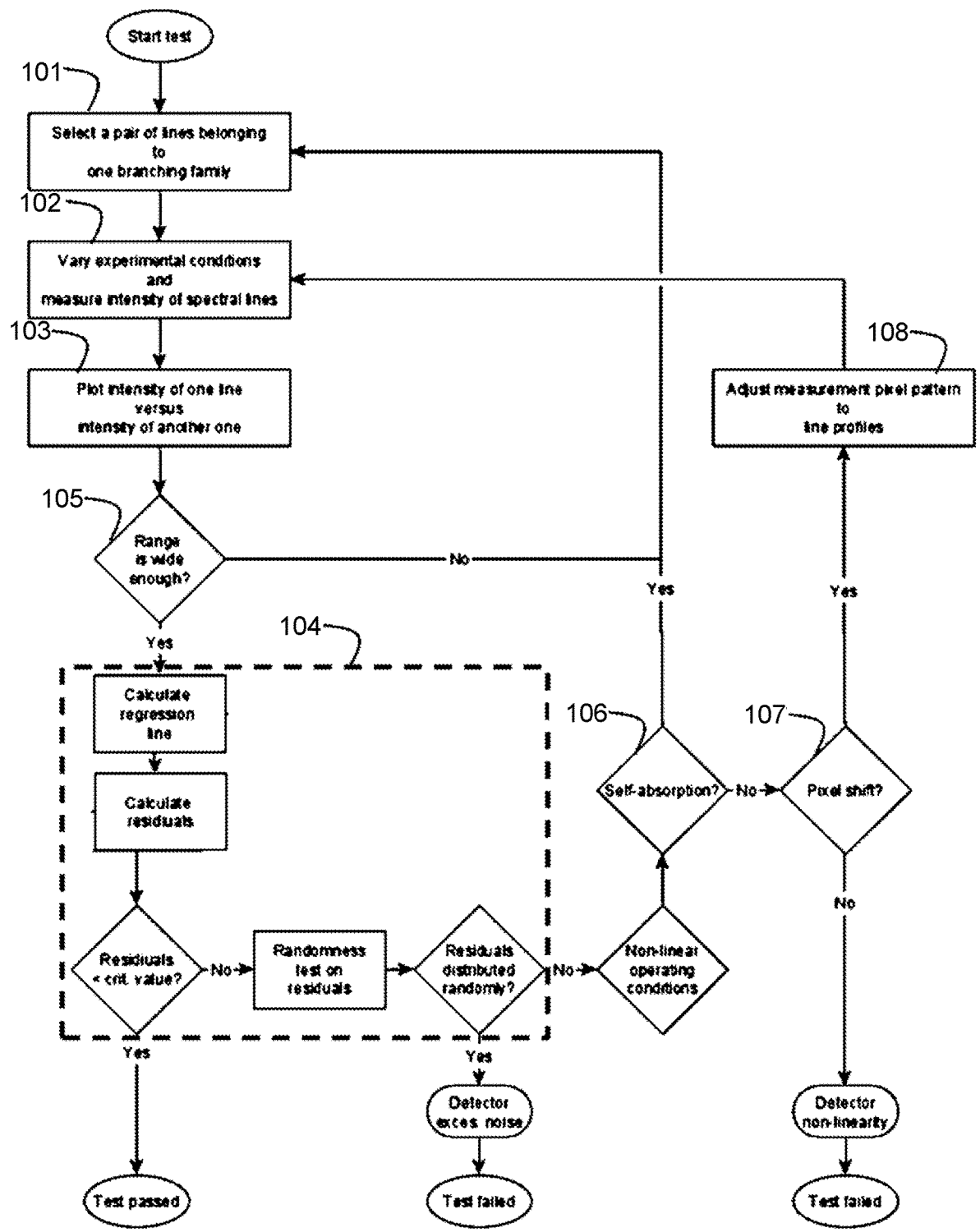
FIG. 3B shows an example flow chart of diagnostic testing method according to another embodiment of the disclosure.

An embodiment of a method in which the spectrometer 10 uses further statistical tests to determine if the detector 13 is operating in an excessive noise irregular operating condition or non-linear irregular operating condition at step 104 is shown in FIG. 3B.

In some embodiments, the processor 14 uses the calculated intensity ratios to determine if the detector 13 is operating in an irregular operating condition or a normal operating condition. In some embodiments, the processor 14 may compare the calculated intensity ratios against each other, or against a known ratio of transition probabilities. Where the difference between the intensity ratios, or a difference between the calculated intensity ratios and the know ratio exceeds a predetermined threshold, the irregular operating condition may be determined. The predetermined threshold on which the processor 14 bases the determination of the irregular operating condition may be specified as an absolute value, or as a relative amount (i.e. a percentage) of the e.g. known ratio. For example, in one embodiment, the processor 14 may determine that where a calculated ratio ($K'_n$) for the $n^{th}$ measurement differs from the known ratio (K) by more than a predetermined threshold α%, the irregular operating condition may be determined. In other embodiments, the threshold may be 10%, 5%, 3%, 2%, 1%, 0.5%, or 0.1%. The threshold specified may reflect the expected accuracy of the detector. In some embodiments, the threshold to be used by the processor 14 may be specified by a user prior to the start of the diagnostic testing method. Where the detector is operating within the range specified by the threshold, the processor 14 may determine that the operating condition of the detector is normal (i.e. linear).

As discussed above in step 102, the spectrometer 10 performs a plurality of detector diagnostic measurements. In some embodiments, the spectrometer 10 performs at least 2 detector diagnostic measurements. In other embodiments, the spectrometer 10 performs at least: 3, 5, 7 or 9 detector diagnostic measurements. Increasing the number of measurements performed by the spectrometer 10 may improve the degree of accuracy with which the diagnostic testing method can determine if the detector 13 is operating in a linear manner.

In step 105, the processor may perform a brief check to see if the diagnostic testing method has been performed over a suitable working range of the detector. If the diagnostic testing method has not been performed over a wide enough working range, the processor may direct the spectrometer 10 to perform further detector diagnostic measurements to increase the range over which the diagnostic testing method is performed.

Accordingly, the processor 14 may determine an operating condition of the detector 13 based on the measurement data of the spectral line intensities. In the embodiments of FIGS. 3A and 3B, the operating condition determined may be that the detector is operating in a linear manner, or that the detector is operating in an irregular manner. In the event that the operating condition of the detector is determined to be linear, the diagnostic test of the detector 13 ends and the operating condition of the detector 13 is not investigated further.

As shown in FIGS. 3A and 3B, in the event that the operating condition of the detector 13 is initially determined to be irregular, a series of further checks and analyses may be performed. The checks and analyses are optional, and so in some embodiments the determination of the non-linear behaviour may result in the end of the diagnostic test with an output to the user to further investigate the operating condition of the detector 13. Accordingly, the diagnostic testing method performed using the spectrometer 10 may allow a user to quickly identify whether or not the detector 13 is behaving as expected. This in turn allows a user to quickly identify whether the operating condition of the detector can be eliminated from a fault-finding procedure, or whether further investigation of the operating condition of the detector is required.

As noted above, in FIGS. 3A and 3B a series of further checks and analyses may be performed in the event that an operating condition of the detector is determined to be non-linear. As discussed above in relation to FIG. 3B, the spectrometer may determine whether the irregular operating condition is the result of excessive noise. In the event that the excessive noise operating condition is detected, the spectrometer 10 may output a notification and end the diagnostic method.

The spectrometer 10 may also perform further checks. Said checks are particularly applicable where the detector is determined to be operating in a non-linear operating condition. In step 106 of FIG. 3A and FIG. 3B, the processor 14 may check to see if the pair of branched spectral lines measured has been subject to self-absorption phenomena. The processor 14 may check for self-absorption phenomena by comparing the wavelengths of the spectral lines measured as part of the plurality of detector diagnostic measurements against a list of known spectral lines that are known to be prone to self-absorption. The list of known spectral lines may be stored in the memory 15. In some embodiments, the processor 14 may also check individual measurements of pairs of spectral lines to see if the expected intensity relationship between the pair of measured spectral lines is maintained. That is to say, the processor 14 may predict an expected intensity for the one spectral line based on the measured intensity of one or more other spectral lines. Where the expected intensity for the second spectral line does not suitably match the measured intensity of the second spectral line, the processor 14 may determine that self-absorption has occurred. In some embodiments, the spectrometer 10 may be configured to perform the plurality of detector diagnostic measurements using light which is emitted from a plasma source in both a radial direction and an axial direction. That is to say, the source of line spectra may emit light in directions which are orthogonal to each other by illuminating the detector 13 with light from the source of line spectra which is generated in two directions which are orthogonal to each other. In this manner, it may be possible to detect self-absorption phenomena by comparing the detector diagnostic measurement of the light in a first direction to the detector diagnostic measurement of the light generated in the second, orthogonal direction.

Where the processor 14 determines that self-absorption phenomena have occurred using one or more of the criteria discussed above, the processor 14 may determine that a different pair of branched spectral lines should be selected for step 101 and the diagnostic testing method should be repeated using the different pair of branched spectral lines. As such, the diagnostic testing method may automatically warn the user and correct for the occurrence of self-absorption phenomena.

Where the processor 14 does not detect self-absorption phenomena having occurred using any of the above criteria, the processor may conclude that the non-linearity detected in the intensity measurement is not the result of self-absorption phenomena. In some embodiments, the processor 14 may then conclude that the detector 13 is behaving in a non-linear manner and that further investigation may be required. As shown in FIGS. 3A and 3B, the processor 14 may also perform an analysis at step 107 to see if line positioning error has occurred during, or prior to, the performance of the plurality of detector diagnostic measurements. Line positioning error may occur in some detectors 13, for example an echelle detector. Line positioning error occurs when the measured location of the spectral line differs from the expected location of the spectral line on the echelle detector. The location of the spectral line may wander due to drift. Drift may occur due to temperature variations in the angles or relative distances of the gratings in the optics or of the grating and the prism in the optics, causing the location of the peaks of the echelle spectrum to change. As a result of line positioning error, peaks corresponding to spectral lines may not be identified, or may be measured incorrectly.

Various methods for detecting and correcting for line positioning error are known to the skilled person. For example, in some embodiments the spectrometer may adjust the measurement pixel pattern to the expected line profiles (step 108). The spectrometer may adjust the detector 13 and/or optical arrangement 12 to correct for the line positioning error previously detected. In other embodiments, it may be possible to recalibrate the measured intensities in order to correct for the detected pixel shift. A further discussion of some of the possible manners in which the skilled person may correct for or account for line positioning error are disclosed in U.S. Pat. Nos. 6,029,115, and 7,319, 519.

As shown in the embodiments of FIGS. 3A and 3B, in the event that line positioning error is detected, the measurement pixel pattern is adjusted to account for the shift in the positions of the spectral lines in the echelle spectrum and the plurality of detector diagnostic measurements are repeated (step 102). In the event that the line positioning error is not detected in the embodiments of FIGS. 3A and 3B, the processor 14 concludes that the detector is behaving in an irregular manner and that the processor 14 has been unable to determine any cause for this occurrence. Accordingly, the processor 14 flags that the detector 13 may be behaving in an irregular manner to the user.

Accordingly, a diagnostic testing method for a spectrometer is provided. The diagnostic testing method as described above and as shown in FIGS. 3A and 3B allows for a user to determine whether a detector is behaving in a linear or non-linear manner in a quick and efficient manner.

Figure 6:
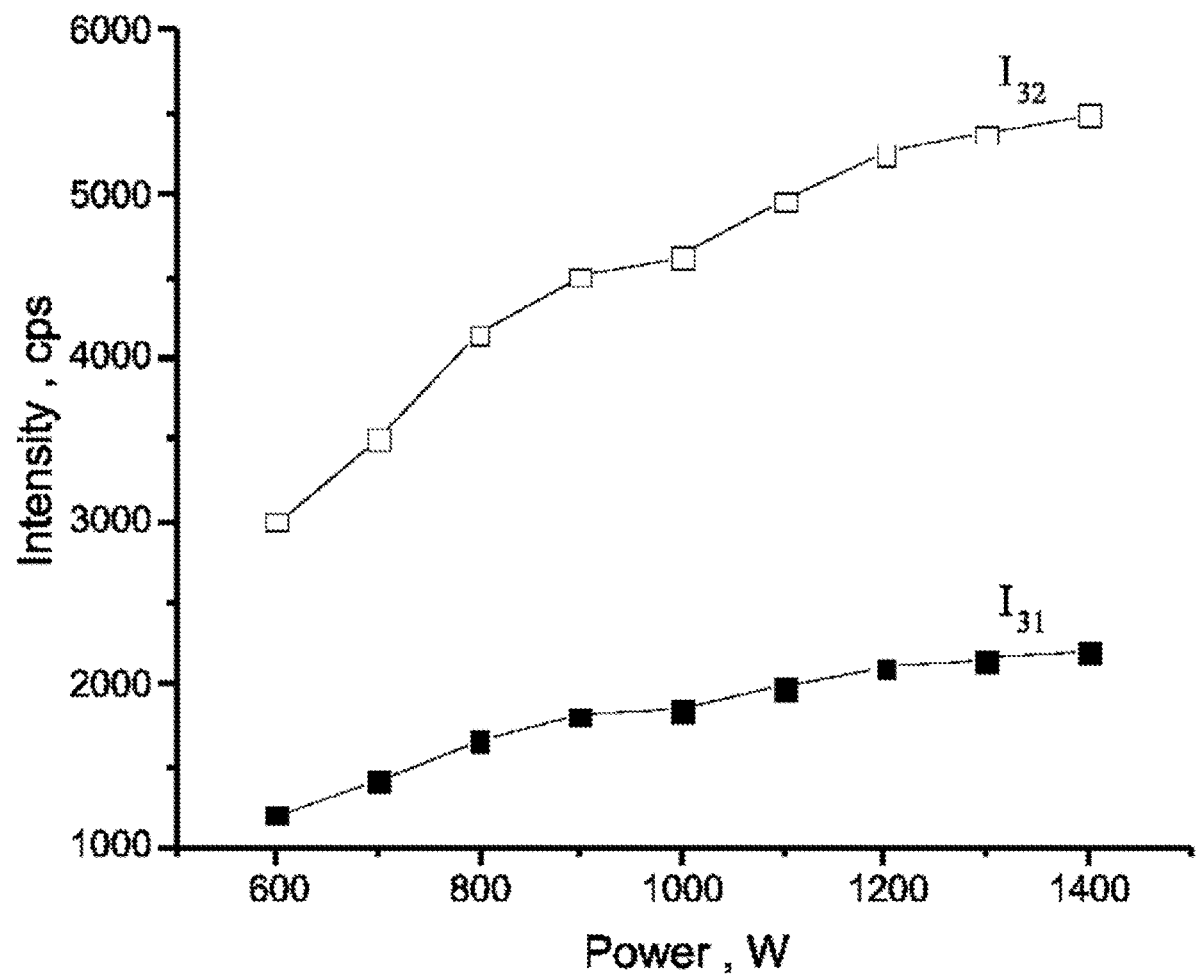
FIG. 6 shows a graph of branched pair spectral line intensity for different nebulizer gas flow rates.

As noted above, in the embodiments of FIGS. 3A and 3B the processor 14 controls the spectrometer in order to vary the intensity of the first and second spectral lines. Of course, in other embodiments, the processor 14 may control other parameters of the spectrometer 10 in order to vary the intensity of the first and second spectral lines. An example of the variation in the intensity of the spectral lines measured in response to a variation in the power supplied to the ICP light source is shown in FIG. 6. It will be appreciated from FIG. 6 that the parameter of spectrometer varied in order to control the intensity of the spectral lines does not need to have a linear relationship between the parameter and the measured intensity of one spectral line. The relationship between the intensity of the first spectral line and the intensity of the second spectral line however will be linear due to the fixed relationship between the expected transition probabilities. FIG. 6 shows, by way of example, a simulation of spectral line intensities for first and second spectral lines under different powers supplied to an ICP light source.

In other embodiments one or more optical elements of the optical arrangement 12 may be controlled in order to vary the intensity of the source of line spectra incident on the detector 13. As such, the diagnostic testing method of this disclosure is not limited to the examples of varying the intensity of the first spectral and second spectral lines discussed above.

In the embodiments of FIGS. 3A and 3B, in step 101 a single pair of branched spectral lines was selected for measurement during the diagnostic testing method. In other embodiments, more than one pair of branched spectral lines may be measured. By measuring different pairs of branched spectral lines, the operating condition of the detector may be determined over a range of different wavelengths. Where the detector to be diagnosed is a multichannel detector, this may expand the number of tested pixels (channels) of the multichannel detector and the range of intensities measured. As such, in some embodiments, in step 101 a plurality of pairs of branched spectral lines may be selected for analysis using the method.

As such, in some embodiments the diagnostic testing method may comprise performing a further plurality of detector diagnostic measurements using a different pair of spectral lines emitted by an excited species of the source of line spectra. The different pair of spectral lines emitted by the excited species of the source of line spectra form a different branched pair of spectral lines. The different pair of spectral lines may be emitted by the same excited species, For example, in the example of FIG. 2 a first pair of spectral lines may be $hv_{32}$ and $hv_{31}$, while a second (different) pair of branched spectral lines is $hv_{32}$ and $hv_{30}$. In some embodiments, the diagnostic testing method may be repeated entirely using the different pair of spectral lines in place of the first and second spectral lines. In other embodiments, the different pair of spectral lines may be measured in step 102 at the same time (simultaneously) with the first and second spectral lines, or sequentially afterwards. The determination of the operating condition may then take into account measurements from both pairs of spectral lines, or may determine the operating condition of the detector 13 on a wavelength basis (corresponding to the wavelengths of the first, second, third, and fourth spectral lines).

Accordingly, embodiments of this disclosure provide a diagnostic testing method for a detector of a spectrometer comprising a source of line spectra. Use of a source of line spectra for the diagnostic testing method allows the diagnostic testing method to be performed with improved accuracy and efficiency. It may be noted that the diagnostic approaches taught herein can be used to check linearity of not only the detector, but also all components of an entire measurement system, including but not limited to plasma sources (e.g., for absence of self-absorption effects), analyzers and even sample introduction systems.

Experimental Results

Figure 7:
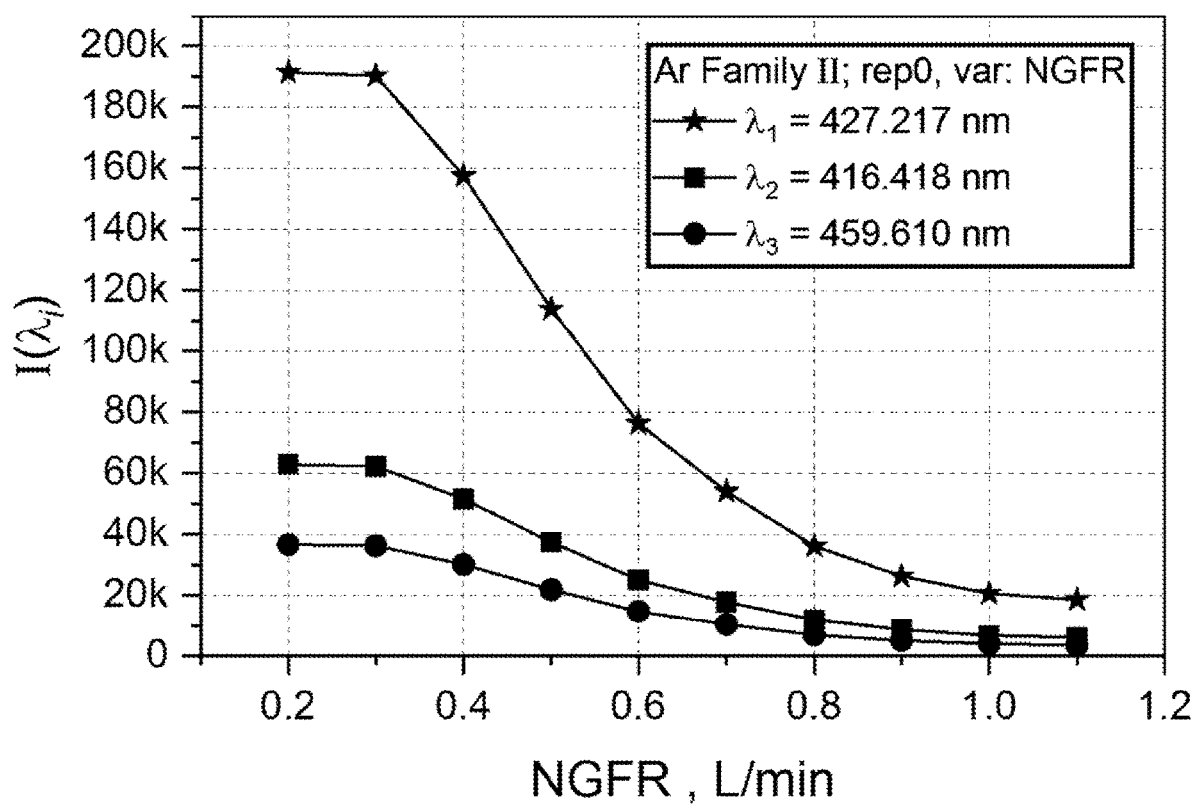
FIG. 7 is a graph of spectral line intensities of the Ar branching family II obtained by an optical emission spectrometer for varying nebulizer gas flow rates (NGFR)

FIG. 7 shows an example of experimental measurements obtained by an ICP optical emission spectrometer. The experimental measurements may be used as part of a diagnostic testing method according to embodiments of this disclosure. FIG. 7 shows the intensities of spectral lines $\lambda_1=427.217$ nm, $\lambda_2=416.418$ nm, $\lambda_3=456.610$ nm of the Ar branching family II for varying nebulizer gas flow rates (NGFR). The measurement shown in FIG. 7 was repeated three times.

Figure 8:
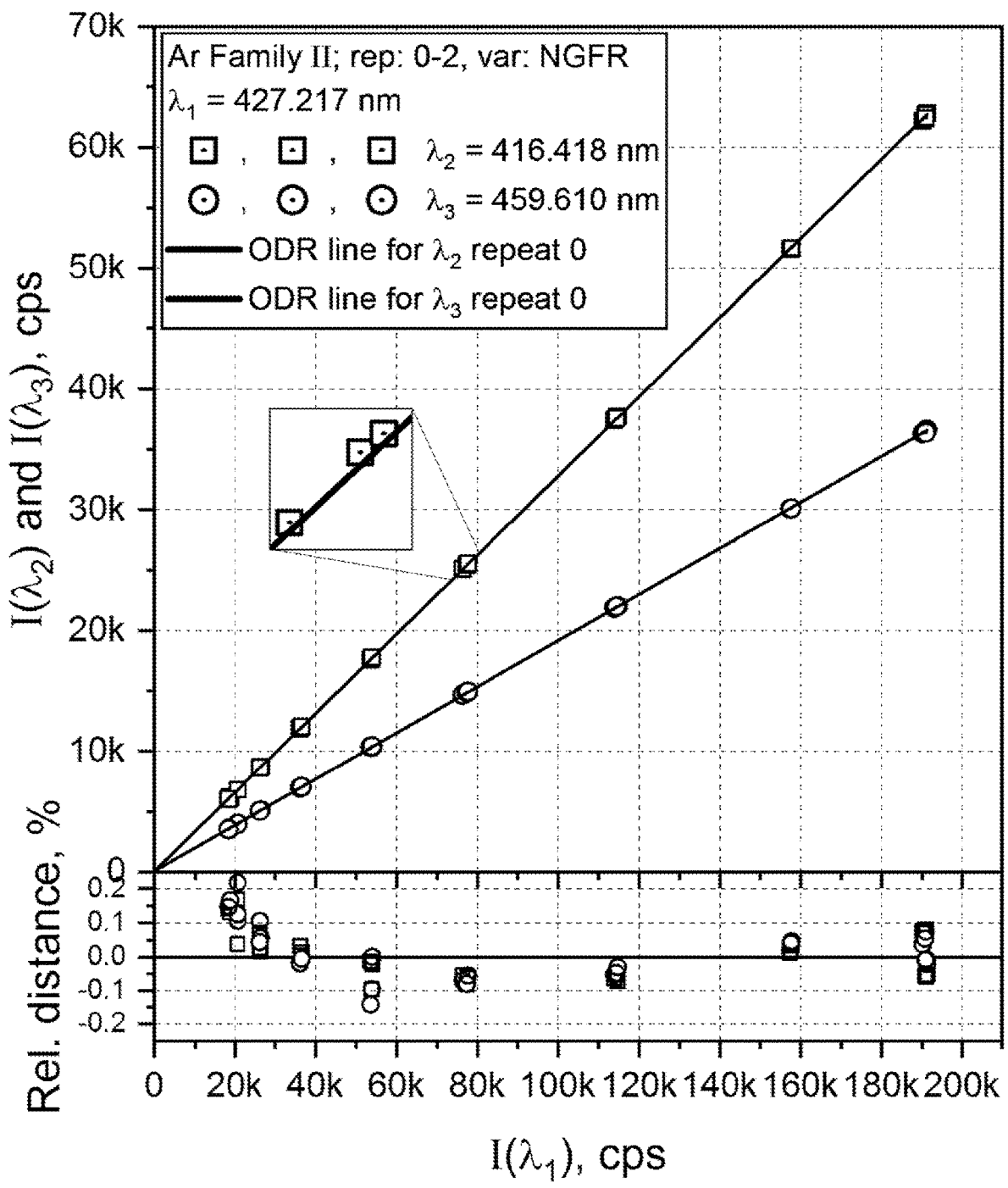
FIG. 8 shows: (top) a graph of the spectral line intensities of FIG. 7 plotted against each other, and (bottom) a plot of the residuals for each spectral line shown in the graph of spectral line intensities (top portion of the figure)

FIG. 8 shows a plot of the spectral line intensities of FIG. 7 plotted against each other. As shown in FIG. 8, the intensity for spectral lines $\lambda_2$ and $\lambda_3$ are plotted against the spectral line intensities for $\lambda_1$. Repeated (three) measurements were performed at each NFGR. As shown in FIG. 8, an orthogonal distance regression (ODR) line is calculated for each of the branched pairs ($\lambda_1, \lambda_2; \lambda_1, \lambda_3$). The inset of FIG. 8 shows a detailed view of part of the regression line for the $\lambda_1, \lambda_2$ plot. The positions of the experimental points corresponding to the repetitive measurements illustrate the precision that may be observed according to the diagnostic methods of this disclosure. Despite the presence of the flicker noise in each individual measurement under the same experimental conditions (at constant NGFR here) the experimental points are not scattered randomly but lie on the same regression line. The remaining relatively small deviations from the ODR lines (less than 0.06% in FIG. 8) can be attributed to shot noise. The ODR lines shown in FIG. 8 were calculated using NIST DATAPLOT software and used here to demonstrate the principles of this invention.

It will be appreciated that other techniques can be used instead to construct similar regressions, for example the methods discussed above in relation to FIG. 5.

The lower section of FIG. 8 shows the relative distances between the experimentally measured points and the regression line for each experimental measurement. It can be seen that the pattern is governed by shot noise mainly. As such, the system can be considered to be linear over more than 5 orders of magnitude with only shot noise governed precision (i.e., less than 0.1% for the highest half of working range).

Figure 9:
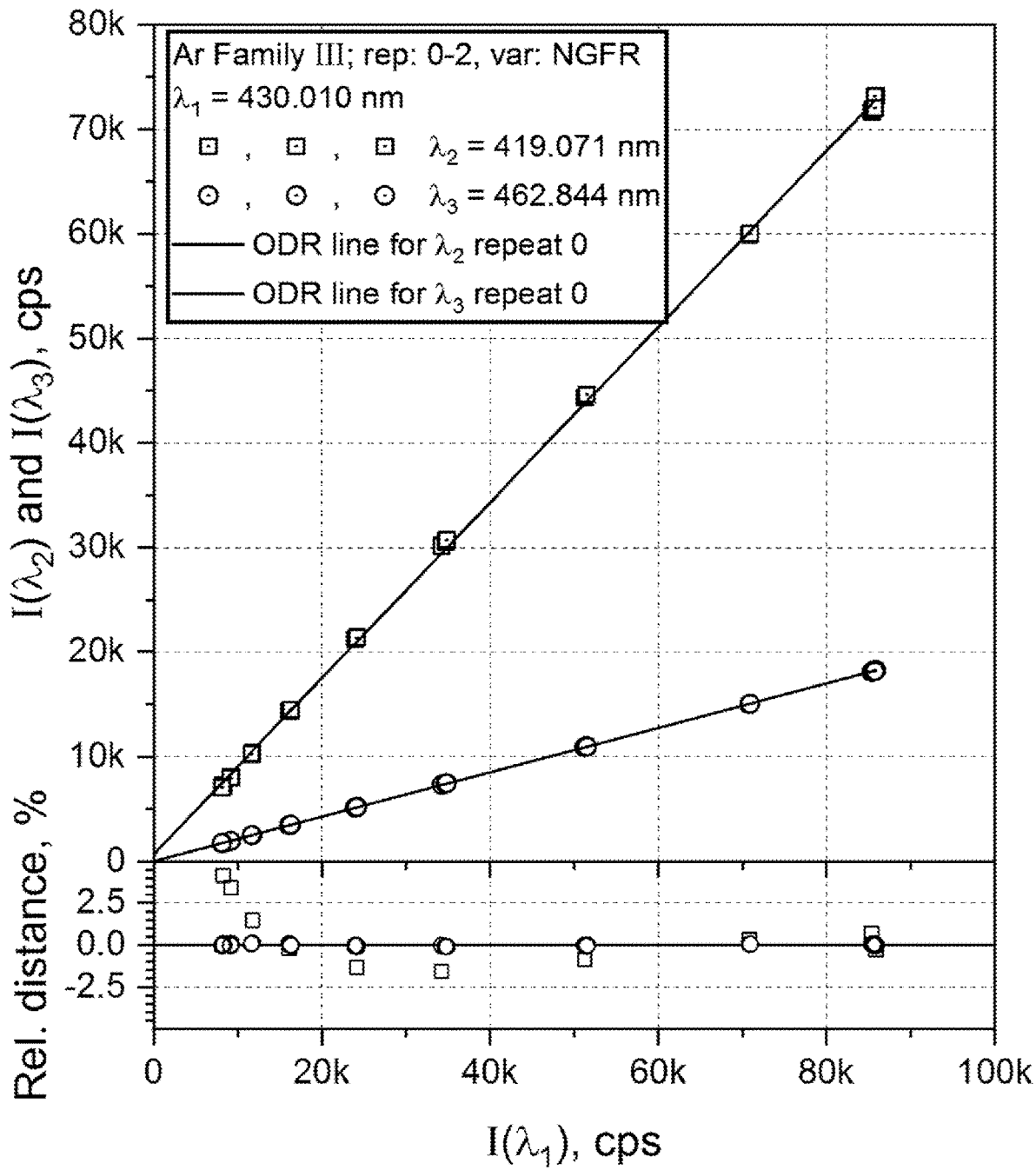
FIG. 9 shows: (top) a graph of the spectral line intensities of the Ar branching family III obtained by an optical emission spectrometer for varying nebulizer gas flow rates plotted against each other, and (bottom) a plot of the residuals for each spectral line shown in the graph of spectral line intensities (top portion of the same figure).

FIG. 9 shows graphs of branched pair spectral line intensities measured by a detector for different nebulizer gas flow rates (NGFR) with lines belonging to Ar branching family III. The experimental points corresponding to individual repeats are overlapping in the graph showing relative distances. While for spectral line ratio $\lambda_1, \lambda_3$ demonstrate linear behaviour with deviations less than 0.1%, the intensity residuals for spectral line ratio line $\lambda_1, \lambda_2$ (known to result from a transition to a metastable level and hence prone to self-absorption) shows a clear non-linear character. Accordingly, in step 106 of a method according to this disclosure, the processor 14 may determine that the pair of branched spectral lines measured is subject to self-absorption phenomena. The processor 14 may check for self-absorption phenomena by comparing the wavelengths of the spectral lines measured as part of the plurality of detector diagnostic measurements against a list of known spectral lines and confirm that $\lambda_2$ is known to be prone to self-absorption. The list of known spectral lines may be stored in the memory 15. Accordingly, in some embodiments, the method may discard branched pair measurements including the spectral line $\lambda_2$. Such spectral lines may also be excluded a priori, before the measurements, as not suitable for the use in the test under chosen conditions.

The invention claimed is:

1. A diagnostic testing method for a detector of a spectrometer system that comprises a source of electromagnetic line spectra, a spectrometer comprising one or more optical elements configured to receive the electromagnetic line spectra from the source of electromagnetic line spectra, and the detector, wherein the detector is assembled onto the spectrometer and configured to receive the electromagnetic line spectra from the spectrometer, the diagnostic testing method comprising:

performing a plurality of detector diagnostic measurements, each detector diagnostic measurement comprising:

measuring an intensity of a first spectral line emitted by an excited species of the source of electromagnetic line spectra using the detector; and measuring an intensity of a second spectral line emitted by the excited species of the source of electromagnetic line spectra using the detector, wherein the first and second spectral lines emitted by the excited species of the source of electromagnetic line spectra form a branched pair of spectral lines and wherein the spectrometer is controlled in order to vary the intensity of the first and second spectral lines incident on the detector for the plurality of detector diagnostic measurements; and diagnosing an operating condition of the detector based on a ratio of the intensity of the first spectral line to the intensity of the second spectral line for each of the plurality of detector diagnostic measurements, wherein the operating condition of the detector diagnosed comprises a normal operating condition, or an irregular operating condition, and wherein, where the irregular operating condition is diagnosed, the method further comprises diagnosing a non-linear operating condition or an excessive noise operating condition based on a ratio of the intensity of the first spectral line to the intensity of the second spectral line for each of the plurality of detector diagnostic measurements.

2. A diagnostic testing method according to claim 1, wherein:

at least one of the source of electromagnetic line spectra, the detector, and one or more optical elements is controlled in order to vary the intensity of the first and second spectral lines incident on the detector for the plurality of detector diagnostic measurements.

3. A diagnostic testing method according to claim 1, wherein:

the source of electromagnetic line spectra is a plasma source; and the plasma source is controlled in order in order to vary the intensity of the first and second spectral lines incident on the detector.

4. A diagnostic testing method according to claim 3, wherein controlling the plasma source in order to vary the intensity of the first and second spectral lines comprises controlling one or more of: a plasma power, a plasma gas flow rate, a nebulizer gas flow rate, and a cooling gas flow rate.

5. A diagnostic testing method according to claim 1, wherein the measurement of the intensity of the first spectral line is performed at the same time as the measurement of the intensity of the second spectral line.

6. A diagnostic testing method according to claim 1, further comprising, with the spectrometer system:

performing a further plurality of detector diagnostic measurements using a different pair of spectral lines emitted by an excited species of the source of electromagnetic line spectra, wherein the different pair of spectral lines emitted by the excited species of the source of electromagnetic line spectra form a different branched pair of spectral lines to the first and second spectral lines.

7. A diagnostic testing method according to claim 1, wherein diagnosing the normal operating condition of the detector comprises determining that the ratio of the intensity of the first spectral line to the intensity of the second spectral line for each of the plurality of detector diagnostic measurements forms a linear relationship.

8. A diagnostic testing method according to claim 7, wherein a linear relationship is determined when each of the ratios determined for the plurality of detector diagnostic measurements falls within a predetermined range.

9. A diagnostic testing method according to claim 1, wherein if a non-linear operating condition is diagnosed, the diagnostic testing method further comprises:

determining whether the first spectral line and/or the second spectral line forming a branched pair of spectral lines are subject to a self-absorption phenomenon.

10. A diagnostic testing method according to claim 9, wherein
if self-absorption of the first and/or second spectral line is determined, the diagnostic method is repeated using a different pair of branched spectral lines having different wavelengths.

11. A diagnostic testing method according to claim 1, wherein
if a non-linear operating condition is diagnosed, the diagnostic testing method further comprises:
determining whether the measurements of the first spectral lines and/or the measurements of the second spectral lines are subject to line positioning error.

12. A diagnostic testing method according to claim 11, wherein
if line positioning error is determined to have occurred:
the spectrometer is adjusted to reduce line positioning error, and the plurality of detector diagnostic measurements are repeated, or
the measurements of the first and second spectral lines are recalibrated to account for the line positioning error, and the operating condition of the detector is determined based on a ratio of a recalibrated intensity of the first spectral line to a recalibrated intensity of the second spectral line for each of the plurality of detector diagnostic measurements.

13. A diagnostic testing method according to claim 1, wherein
the diagnostic testing method is performed on one or more of:
a photomultiplier tube detector, a charge coupled detector (CCD), a complementary metal oxide semiconductor (CMOS) detector, and a charge injection device (CID) detector.

14. A diagnostic testing method according to claim 1, wherein the excited species are provided by one or more of:
a standard solution having a known concentration nebulised into the plasma; and
a plasma gas species.

15. A spectrometer system comprising:
a source of electromagnetic line spectra;
a spectrometer comprising one or more optical elements configured to receive the electromagnetic line spectra from the source of electromagnetic line spectra;
a detector assembled onto the spectrometer and configured to receive the electromagnetic line spectra from the spectrometer; and
a controller,
wherein the controller is configured to cause the spectrometer to perform a diagnostic test of the detector comprising:
causing the spectrometer to perform a plurality of detector diagnostic measurements, wherein for each diagnostic detector measurement:
the detector is configured to measure an intensity of a first spectral line emitted by an excited species of the source of electromagnetic line spectra; and
the detector is configured to measure an intensity of a second spectral line emitted by the excited species of the source of electromagnetic line spectra,
wherein the first and second spectral lines emitted by the excited species of the source of electromagnetic line spectra form a branched pair of spectral lines and wherein the controller is configured to control the spectrometer in order to vary the intensity of the first and second spectral lines incident on the detector for the plurality of detector diagnostic measurements,
wherein the controller is further configured to diagnose an operating condition of the detector based on a ratio of the intensity of the first spectral line to the intensity of the second spectral line for each of the plurality of detector diagnostic measurements, wherein the operating condition of the detector diagnosed comprises a normal operating condition, or an irregular operating condition, and
wherein the controller is further configured to, upon diagnosing the irregular operating condition, diagnose a non-linear operating condition or an excessive noise operating condition based on a ratio of the intensity of the first spectral line to the intensity of the second spectral line for each of the plurality of detector diagnostic measurements.

16. A spectrometer system as recited in claim 15, wherein the controller is further configured to cause operation of at least one of the source of electromagnetic line spectra, the detector, and one or more optical elements to vary the intensity of the first and second spectral lines incident on the detector for the plurality of detector diagnostic measurements.

17. A spectrometer system as recited in claim 15, wherein:
the source of electromagnetic line spectra is a plasma source; and
the controller is further configured to cause the plasma source vary its operation, during the plurality of detector diagnostic measurements, so as to vary the intensity of the first and second spectral lines incident on the detector.

18. A spectrometer system as recited in claim 17, wherein:
the operation of the plasma source is varied by varying one or more of: a plasma power, a plasma gas flow rate, a nebulizer gas flow rate, and a cooling gas flow rate.

19. A spectrometer system as recited in claim 15, wherein the controller is configured to cause the spectrometer to perform the diagnostic test of the detector whereby, for at least one diagnostic detector measurement, the measurement of the intensity of the first spectral line is performed at the same time as the measurement of the intensity of the second spectral line.

20. A spectrometer system as recited in claim 15, wherein the controller is configured to cause the spectrometer to perform the diagnostic test of the detector whereby:
a further plurality of detector diagnostic measurements is performed using a different pair of spectral lines emitted by the source of electromagnetic line spectra,
wherein the different pair of spectral lines emitted by the source of electromagnetic line spectra form a different branched pair of spectral lines to the first and second spectral lines.

* * * * *